United States Patent
Klann

(10) Patent No.: US 6,862,788 B2
(45) Date of Patent: Mar. 8, 2005

(54) ECCENTRIC PRESSURE PLATES FOR SPRING VICES

(75) Inventor: Horst Klann, Villingen-Schwenningen (DE)

(73) Assignee: Klann Tools Ltd., Oxfordshire (GB)

( * ) Notice: Subject to any disclaimer, the term of this patent is extended or adjusted under 35 U.S.C. 154(b) by 39 days.

(21) Appl. No.: 10/304,432

(22) Filed: Nov. 26, 2002

(65) Prior Publication Data

US 2003/0098448 A1 May 29, 2003

(30) Foreign Application Priority Data

Nov. 27, 2001 (DE) .................................... 201 19 267 U

(51) Int. Cl.⁷ ................................................ B23P 19/04
(52) U.S. Cl. ........................................ 29/227; 254/10.5
(58) Field of Search .................. 29/227, 225; 254/10.5; 411/104

(56) References Cited

U.S. PATENT DOCUMENTS

| 4,872,645 A | * 10/1989 | Dossier ...................... 254/10.5 |
| 5,564,172 A | * 10/1996 | Klann .......................... 29/227 |

FOREIGN PATENT DOCUMENTS

| DE | 88 15 706.7 | 3/1989 |
| DE | 692 00 401 T2 | 5/1995 |
| EP | 0 115 774 | 8/1984 |
| EP | 0 271 782 | 6/1988 |

* cited by examiner

Primary Examiner—Robert C. Watson
(74) Attorney, Agent, or Firm—McGlew and Tuttle, P.C.

(57) ABSTRACT

A spring vice is provided with a tensioning device that can be axially introduced into a coil spring to be tensioned. A first disk-shaped pressure plate is provided with an opening and can be detachably connected to a first end of the tensioning device via its said opening. A second pressure plate is provided with an opening and can be detachably connected via its opening to an adjusting member of the tensioning device. The adjusting member is adjustable relative to the first end of the tensioning device. The tensioning device has a drive, especially in the form of a spindle drive, provided with a wrench profile accessible from the outside, at its second end, for adjusting the adjusting member. Each of the pressure plates has a circular tensioning surface which is limited toward the inside and the outside and is interrupted by a recess, for receiving a spring turn each of the coil spring to be tensioned. The opening of at least one of the pressure plates is arranged eccentrically offset in the pressure plate relative to the coil spring for setting the position of the drive of the tensioning device of the spring vice attached to the coil spring.

14 Claims, 2 Drawing Sheets

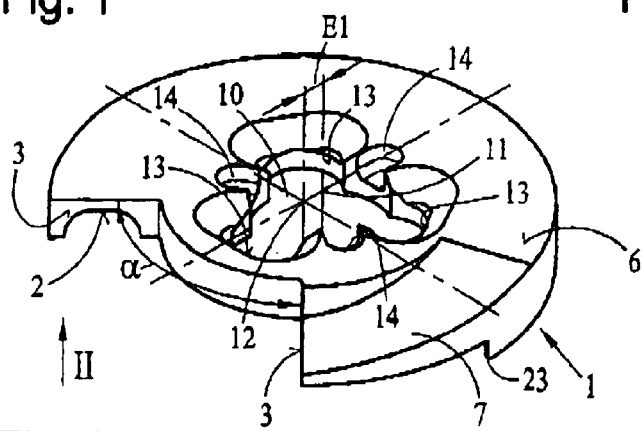
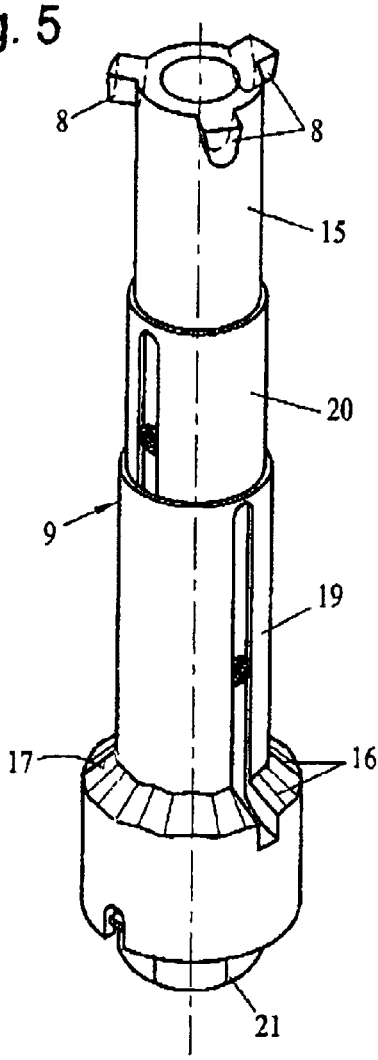
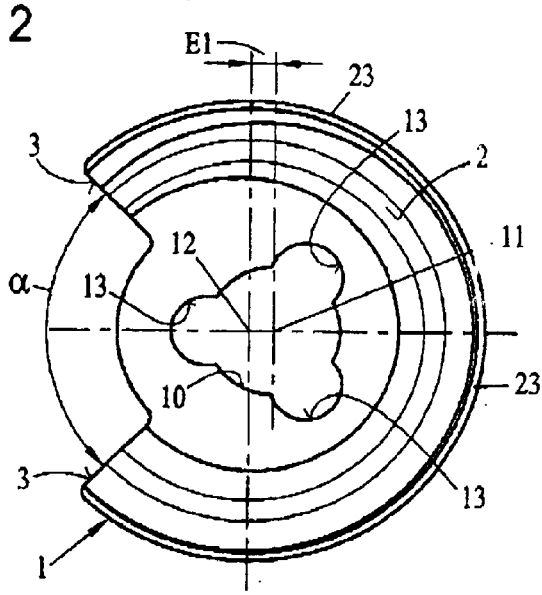
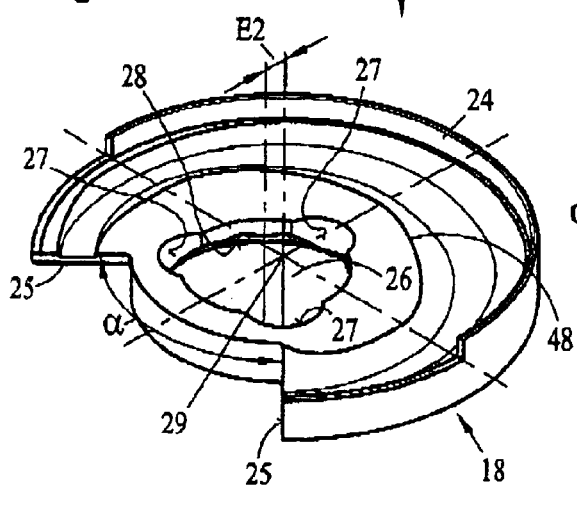
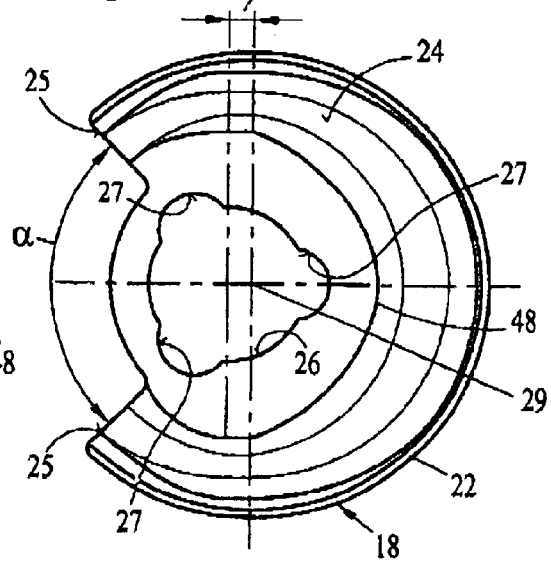

ECCENTRIC PRESSURE PLATES FOR SPRING VICES

FIELD OF THE INVENTION

The present invention pertains to a spring vice comprising a tensioning device that can be axially introduced into a coil spring to be tensioned and a first, disk-shaped pressure plate provided with an opening, which pressure plate can be detachably connected via its opening to a first end of the tensioning device, as well as a second, disk-shaped pressure plate, which is provided with an opening and which can be detachably connected via its opening to an adjusting member of the tensioning device, which adjusting member is adjustable in relation to the first end of the tensioning device, wherein the tensioning device has a drive, especially in the form of a spindle drive provided with a wrench profile accessible from the outside, at its second end for adjusting the adjusting member, and wherein each of the pressure plates has a circular tensioning surface, which is limited toward the inside and toward the outside and is interrupted by a recess, for receiving a spring turn of the coil spring to be tensioned.

BACKGROUND OF THE INVENTION

Spring vices of this type have been known for a long time. For example, EP 0 271 782 B1 discloses a spring vice that comprises a central tensioning device that can be detachably engaged with two disk-shaped pressure plates for tensioning a coil spring. In this prior-art spring vice, the tensioning device comprises a total of three tubular elements, which can be pushed into one another in a telescopic manner. The tubular element with the smallest diameter has positive-locking elements at its free end, with which the tensioning device can be brought into positive-locking engagement with the first pressure plate. To make it possible to engage the pressure plate with these positive-locking elements, a corresponding opening is provided in the pressure plate, through which the tensioning device with its positive-locking elements can be passed and can be brought into positive-locking engagement with depressions in the edge area of the opening. This end tube of the tensioning device, which end tube is designed as a threaded tube, is telescopically in connection via an intermediate tube with a so-called housing tube, which is likewise provided with positive-locking elements in its end area located opposite the positive-locking elements of the threaded tube.

The second pressure plate of this prior-art spring vice is in turn likewise provided with a central opening, with which it can be brought into fixed engagement with this positive-locking element of the housing tube. The two pressure plates have an essentially round basic shape each and are first inserted into the spring turns of the coil spring to be accommodated for tensioning a coil spring. The tensioning device is subsequently passed through the openings of the two pressure plates and is correspondingly brought into engagement with the openings of the pressure plates in a fixed manner. The manner of correctly attaching the prior-art spring vice as well as of the tensioning operation during the tensioning of a coil spring is described in greater detail in EP 0 271 782 B1, so that reference is made in this respect to this document.

In this prior-art embodiment of the spring vice, the openings are arranged concentrically in the approximately round, disk-shaped pressure plates, so that the tensioning device is aligned essentially coaxially to the coil spring to be tensioned within the spring turns of this coil spring during the tensioning of a coil spring. By actuating the drive of the tensioning device, which drive is designed as a spindle drive, the distance between the pressure plates in the axial direction of the coil spring to be tensioned is shortened during the tensioning operation, so that the coil spring is inevitably tensioned. To actuate the tensioning device, a threaded spindle, which is provided with an axially projecting wrench profile in the area of the positive-locking elements of the housing tube, is provided in the tubular elements. The threaded spindle engages with its other end the threaded tube of the tensioning device located opposite the wrench profile, so that the tensioning device is shortened during the actuation of the threaded spindle. It is obvious that the threaded spindle is supported now on the drive side axially via a thrust bearing in a head part of the housing tube in the area of its wrench profile.

Thus, the housing tube with its positive-locking element forms a kind of adjusting member, which is moved toward the positive-locking elements of the threaded tube by actuating the threaded spindle, as a result of which the tensioning of a coil spring is brought about. For receiving a spring turn or at least a partial area of the spring turn of the coil spring to be tensioned, the pressure plates have in turn circular tensioning surfaces which correspond to the coil spring to be tensioned and are radially limited toward the inside and the outside. These tensioning surfaces are provided with a slope in the circumferential direction, so that the radially inner and outer limitation is formed by a corresponding limiting edge provided in these edge areas. These tensioning surfaces are also arranged essentially concentrically in the pressure plates, so that the spring turns are received concentrically in each pressure plate. An essentially concentric alignment of the tensioning device within the coil spring to be tensioned during the tensioning operation is also achieved due to this design of the tensioning surfaces. To pass the spring turns not being grasped by the pressure plates through the particular pressure plate, the tensioning surfaces are interrupted in the circumferential direction by a recess, through which the coil springs can be passed in the axial direction and in the circumferential direction.

In this prior-art spring vice, the tensioning device becomes shorter during the tensioning of the coil spring due to the special design, so that considerable advantages are obtained especially during the removal and mounting of a coil spring on a motor vehicle. For example, coil springs tensioned completely to a stop can be removed from the spring plates of a motor vehicle axle together with the spring vice due to this telescopic shortening of the tensioning device without the axle of the motor vehicle having to be removed.

Such spring vices having a similar design acting in the same manner have also been known, e.g., from EP 0 115 774, and the design of these spring vices is essentially identical in terms of the mode of operation to that of the above-described spring vice according to EP 0 271 782 B1. Reference is made in this respect to these two documents, which show the detailed design as well as the mode of operation of these prior-art spring vices.

Other spring vices of this class have been known as well, whose tensioning device cannot be shortened telescopically, but whose mode of operation is at least similar to that of the above-described spring vices. A relatively long threaded spindle is provided in these spring vices, and positive-locking elements, with which the first pressure plate can be brought into engagement in a replaceable and positive-locking manner, is provided at one end of the said threaded spindle. The second pressure plate is brought into engagement in a positive-locking manner with an approximately cylindrical adjusting member. This adjusting member is mounted axially adjustably on the threaded spindle and is displaced by means of an adjusting nut along the threaded spindle toward the first pressure plate during the tensioning of a coil spring, i.e., the threaded spindle and the adjusting nut form the spindle drive in this type of spring vice, the adjusting nut being provided with the wrench profile. Since the tensioning device is not shortened in a telescopic manner during the tensioning operation in this type of spring vice, the vehicle axle must be removed for inserting and removing the coil spring. These spring vices, which likewise cannot be shortened in a telescopic manner, also share a common feature with the above-described spring vices, namely, that a concentric alignment of the tensioning device in relation to the coil spring to be tensioned is achieved due to the central arrangement of the openings in the likewise round pressure plates.

To make it possible to introduce the tensioning device into the spring and to engage it with the pressure plates, the spring plate, from whose side the tensioning device is to be introduced into the coil spring, has a passage opening through which the tensioning device can be passed. Depending on the design of the axle, the upper spring plate seated on the vehicle body or also the lower spring plate seated on the movable axle body has such a passage opening. A corresponding passage opening, which is either directly adjacent to the passage opening of the spring plate or is located at a certain distance therefrom, which applies especially to the passage opening of the axle body, is likewise present now in the body or in the axle body. It shall be noted that axle bodies in which a type of spring plate is integrated as a one-piece component in the axle body as a spring mount have been known as well.

It was now found that the accessibility of the drive of the spring vice is often limited especially during the tensioning of coil springs that are pretensioned in a slightly bent form in the installed state and/or of coil springs installed between two spring plates arranged offset at right angles to the longitudinal axis of the spring. In such predetermined axle designs, the coil spring has a sloped shape in the installed state, whereas the passage opening of the axle body and the passage opening of the corresponding spring plate or the spring mount integrated in the axle body are arranged concentrically to one another. This in turn causes that when the spring vice is attached correctly to the coil spring, the spring vice with its tensioning device follows the sloped shape of the coil spring, i.e., the tensioning device assumes an oblique position in relation to the axle body when the pressure plates are correctly inserted into the coil spring and the tensioning device has been brought into engagement with the pressure plates, as a result of which the access to the drive, which is located within the axle body in the correctly attached state of the tensioning device, is made at least considerably difficult or becomes altogether impossible. Furthermore, the pressure plate tends to jam or tilt on the tensioning device, especially during the tensioning of the coil springs pretensioned in a bent form, when the pressure plate is to be brought into engagement with the coil springs, i.e., when the tensioning device must be pushed through the pressure plates in order to be brought into engagement with them.

SUMMARY OF THE INVENTION

By contrast, the basic object of the present invention is to eliminate this drawback.

The object is accomplished according to the present invention by providing a spring vice comprising a tensioning device that can be axially introduced into a coil spring to be tensioned. A first disk-shaped pressure plate is provided with an opening and can be detachably connected to a first end of the tensioning device via its said opening. A second pressure plate is provided with an opening and can be detachably connected via its opening to an adjusting member of the tensioning device. The adjusting member is adjustable relative to the first end of the tensioning device. The tensioning device has a drive, especially in the form of a spindle drive, provided with a wrench profile accessible from the outside, at its second end, for adjusting the adjusting member. Each of the pressure plates has a circular tensioning surface which is limited toward the inside and the outside and is interrupted by a recess, for receiving a spring turn each of the coil spring to be tensioned. The opening of at least one of the pressure plates is arranged eccentrically offset in the pressure plate relative to the coil spring for setting the position of the drive of the tensioning device of the spring vice attached to the coil spring.

Due to the design according to the present invention, the position of the drive relative to the coil spring can be set such that the drive is accessible with a wrench tool through the opening of an axle body, on which the coil spring to be tensioned is seated. Furthermore, jamming or tilting especially of the lower pressure plate associated with the adjusting member at the tensioning device is extensively prevented from occurring. Provisions are made for this purpose to arrange the opening of at least one of the pressure plates, which opening can be brought into positive-locking engagement with the tensioning device, eccentrically offset in the pressure plate. By selecting the angular position of the pressure plate inserted into the coil spring to be tensioned correspondingly, the position of the drive of the tensioning device relative to the coil spring and consequently relative to the axle body, in which the coil spring is supported, is adjustable. If this eccentric offset of the opening is selected for the second pressure plate, which can be brought into engagement with the adjusting member of the tensioning device and is consequently located in the area of the drive of the tensioning device, both a radial offset of the drive relative to the coil spring to be tensioned and a change in the axial angular position of the tensioning device within the coil spring are brought about. Alignment of the tensioning device with its drive concerning both the radial offset and concerning the axial alignment of the tensioning device to the passage opening of the axle body are thus ensured for the possibly optimal accessibility for a wrench tool due to the eccentricity of the opening of the second pressure plate associated with the adjusting member. Besides this improvement in the accessibility of the drive, jamming of the tensioning device during pushing into the pressure plates inserted into the coil spring is also prevented from occurring due to the alignment of the axial angular position, because this angular alignment relative to the coil spring also entails a corresponding alignment relative to the pressure plates, so that these cannot tilt on the tensioning device.

The eccentricity of the opening of the second pressure plate associated with the adjusting member may be directed toward the recess of the tensioning surface of this pressure plate. This special eccentric arrangement in relation to the recess of the tensioning surface is especially advantageous in the case of coil springs installed in a bent pretensioned state. The pressure plate is normally attached in this case to the coil spring such that this recess points toward the inner side of the curvature of the coil spring. However, since the oblique positioning of the tensioning device takes place in the opposite direction in the area of the drive with the spring vice attached, this oblique position is compensated by the eccentric offset toward the recess of the tensioning surface when the pressure plate is attached to the coil spring in the corresponding angular position.

Furthermore, in addition to the eccentric offset of the opening in the pressure plate, the inner limiting edge of the tensioning surface may also extend eccentrically in relation to the pressure plate at least in its circumferential area located opposite the recess. This embodiment is intended especially for the second pressure plate associated with the adjusting member. Due to this eccentric course of the inner limiting edge of the tensioning surface, the pressure plate itself can be aligned in relation to the spring turn received and consequently to the coil spring as a whole at least within certain limits, so that this also leads to a corresponding alignment of the tensioning device engaging this pressure plate. The accessibility of the drive of the tensioning device can thus be further improved, because this makes possible an additional setting of the position of the drive.

The direction of the eccentricity of the inner limiting edge of the tensioning surface of the second pressure plate may also be directed toward the recess of the contact surface, as a result of which it is also possible, in particular, to transversely displace the pressure plate in relation to the spring turn received at right angles to the direction of the eccentricity of the opening. The adjustability of the position of the drive is made more variable as a result.

The eccentricity of the opening of the first pressure plate associated with the first end of the tensioning device may be directed opposite the position of the recess of the tensioning surface. A greater oblique positioning of the tensioning device relative to the coil spring to be tensioned can be achieved due to this design, as a result of which the accessibility of the drive is likewise improved. As was mentioned above, the pressure plate associated with the first end of the tensioning device is located now at the end located opposite the drive of the tensioning device, so that essentially only the alignment of the longitudinal central axis of the tensioning device relative to the coil spring to be tensioned is affected by this eccentric arrangement of the opening in this first pressure plate, but the radial position of the drive is essentially not affected.

The amount of the eccentric offset of the openings in the first and second pressure plates may be different or also equal. This depends ultimately on the field of application and the conditions of use.

The opening may also be part of a separate component that can be inserted into the pressure plate in different positions. Such a component may be designed, e.g., as a type of bushing, in which the opening proper, which is to be brought into engagement with the tensioning device, is arranged. Such a special embodiment may be provided especially when the spring vice according to the present invention with its pressure plates shall be able to be used universally under different conditions of use, under which a different eccentric offset of the opening in the pressure plate is necessary. Provisions may be made, in particular, for the component to be also able to be inserted into the pressure plate such that the eccentric offset of the opening in relation to the pressure plate is equal to zero, so that the pressure plate with a component thus inserted can be used like a conventional pressure plate already known from the state of the art, because the opening of the separate component is arranged concentrically in the pressure plate in this case. To receive the component, such a pressure plate may be provided with a kind of elongated hole or the like, into which the component can be inserted in different positions.

To securely fix the displaceable component in the pressure plate in the particular position selected, the component provided with the opening may be able to be fixed in its different positions by means of positive-locking elements arranged differently in the pressure plate. Such positive-locking elements may be designed as a kind of teeth, which are provided here not exclusively on the pressure plate but also on the component itself. The safety of such a pressure plate with the component that can be inserted variably is increased by this measure during the tensioning of a coil spring to be tensioned.

Thus, a spring vice of this type is improved with the design according to the present invention such that it can also be used safely in cases in which flush alignment of a coil spring seated on an axle body or of a tensioning device of a prior-art spring vice, which said tensioning device is attached to the said coil spring, when the opening of the axle body is not possible. The position of the tensioning device inserted into the coil spring for tensioning the coil spring can be adjusted due to the design according to the present invention such that the drive of the tensioning device can be also reached reliably from the outside through the opening of the axle body, e.g., by means of a wrench tool to actuate same. In particular, jamming of the tensioning device, especially during pushing through the lower pressure plate during the insertion of the tensioning device into the pressure plate, is also prevented by the alignment of the axial direction of the tensioning device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective top view of a first pressure plate;

FIG. 2 is a bottom view II of the first pressure plate from FIG. 1;

FIG. 3 is a perspective top view of a second pressure plate;

FIG. 4 is a top view IV of the second pressure plate from FIG. 3;

FIG. 5 is a tensioning device fitting the pressure plates according to the above figures.

DESCRIPTION OF THE PREFERRED EMBODIMENTS

Figure 6:
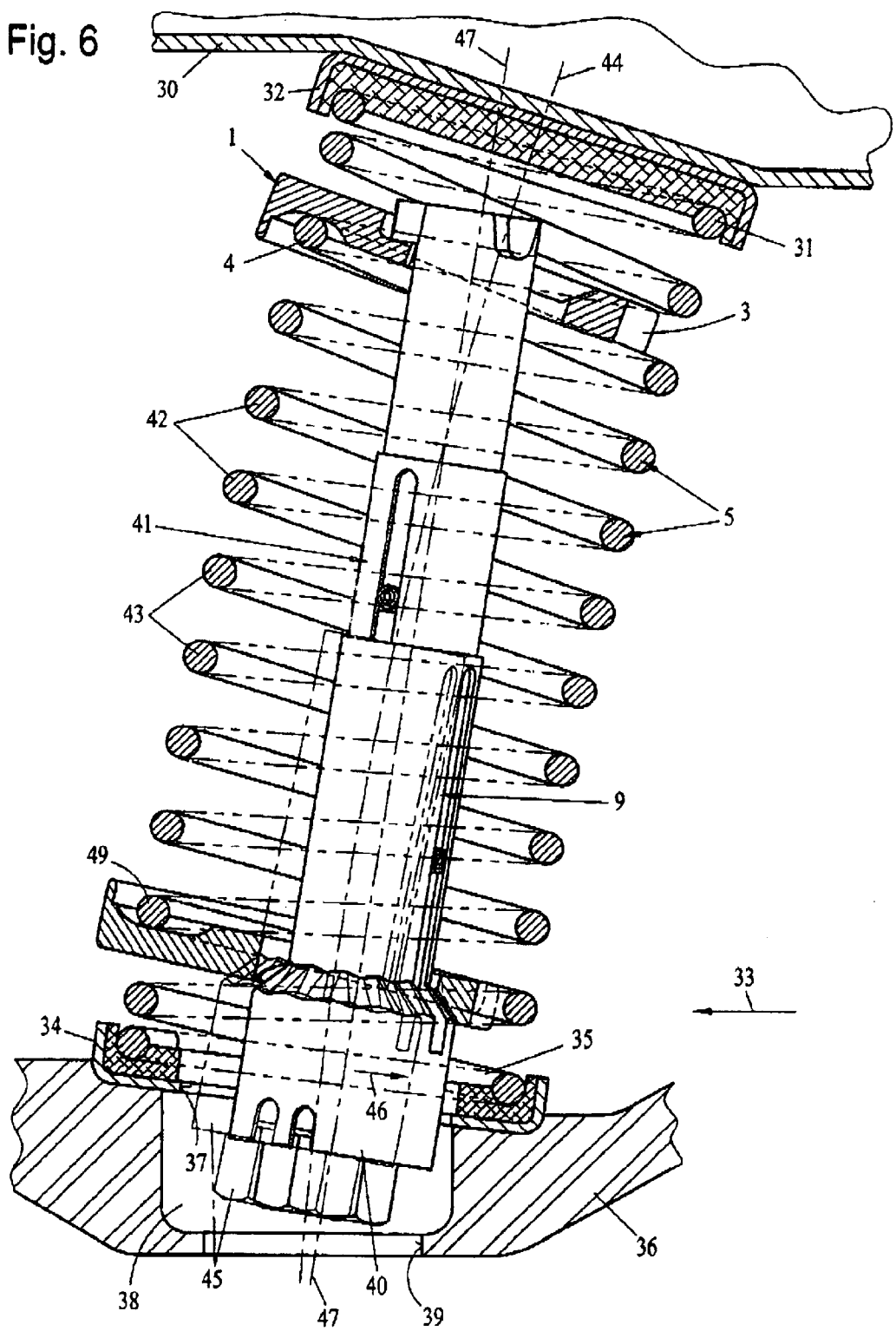
FIG. 6 is a spring vice comprising the pressure plates according to FIGS. 1 through 4 as well as the tensioning device according to FIG. 5 during use.

Referring to the drawings in particular, FIGS. 1 and 2 show a first pressure plate 1, which has, as is already known from the state of the art, an essentially round basic shape. This first pressure plate 1 is provided on the underside with a tensioning surface 2, which is arranged essentially concentrically in the pressure plate 1. The tensioning surface 2 is interrupted in the circumferential direction by a recess 3, which extends in this exemplary embodiment over a circumferential angle α of about 90°. Furthermore, the tensioning surface 2 has a slope in the circumferential direction and is used to receive a spring turn 4 of a coil spring 5 in some areas, as is shown as an example in FIG. 6. The recess 3 of the first pressure plate 1 is used to pass axially through a spring turn of the coil spring to be tensioned during the attachment of the pressure plate to the coil spring. The first pressure plate 1 has, furthermore, a ramp-like recess 7 in the area of its top side 6, which area is shown in the foreground in FIG. 1, so that collision with the first spring turn located outside the pressure plate 1 during the tensioning operation is prevented.

To replaceably fasten the first pressure plate 1 with corresponding positive-locking elements 8 of a tensioning device 9 (FIG. 5), which are designed as radially projecting pins, the first pressure plate 1 has an opening 10, which is arranged in the pressure plate 1 offset eccentrically by an amount E1. As is apparent especially from FIG. 2, the opening 10 with its center 11 is arranged in the first pressure plate 1 offset relative to the center 12 of the first pressure plate 1 in the direction opposite the recess 3 of the tensioning surface 2. To be able to be brought into engagement with the positive-locking elements 8 of the tensioning device 9, the opening 10 has three radial extension openings 13, which are arranged distributed uniformly on the circumference and through which the tensioning device 9 with its three positive-locking elements 8, which are likewise distributed uniformly on the circumference, can be passed axially. For the replaceable and detachable connection of the first pressure plate 1 to the positive-locking elements 8 of the tensioning device 9, respective mounting depressions 14 (FIG. 1), with which the positive-locking elements 8 can be brought into positive-locking engagement, are provided in the circumferential area of the opening 10 between the radial extension openings 13.

FIG. 5 also shows that the tensioning device 9 comprises a threaded tube 15, with the outer free end of which the positive-locking elements 8 are made in one piece. Opposite these positive-locking elements 8, the tensioning device 9 has a seat 17, which is provided with a cylindrical grinding 16 and to which a second pressure plate 18 shown in FIGS. 3 and 4 can be detachably connected. This seat 17 forms an approximately conical, radially expanded contact surface and is part of a housing tube 19, in the lower end area of which this seat 17 is located.

Furthermore, an intermediate tube 20, which is pushed telescopically adjustably into the housing tube 19, is provided between the housing tube 19 and the threaded tube 15. The threaded tube 15 is in turn likewise pushed telescopically adjustably into this intermediate tube 20, so that the positive-locking elements 8 at the top end of the threaded tube 15 can be moved toward the seat 17 of the lower housing tube 19.

A threaded spindle, which is not shown in detail in the drawings and is axially supported in the lower end area of the housing tube 19, is provided for this adjusting movement, and a drive hexagon 21 is provided at the lower end of this threaded spindle, which end protrudes from the housing tube 19. The threaded spindle with its driver hexagon 21 engages a corresponding internal thread at the lower end of the threaded tube 15, so that a longitudinal adjustment of the entire tensioning device 9 takes place, on the whole, during the actuation of this threaded spindle via the drive hexagon 21. The exact functional relationships are known, e.g., from the aforementioned EP document 0 271 782 B1, so that the specific design of this tensioning device will not be discussed here in detail, but reference is made explicitly in this connection to the said prior-art document.

As was mentioned above, the second pressure plate 18 is shown in FIGS. 3 and 4. It can be recognized that this second pressure plate 18 likewise has an essentially round basic shape and is provided with a circular edge web 22. Such an edge web is likewise provided on the first pressure plate 1 and is indicated by the reference number 23 in FIGS. 1 and 2. A received spring turn is prevented from slipping off during the tensioning of the coil spring by this edge web, which extends over a circumferential angle of about 180°.

Furthermore, it can be recognized from FIGS. 3 and 4 that the second pressure plate 18 also has a circular tensioning surface 24, which is interrupted by a recess 25. The recess 25 is likewise used to pass through a spring turn during the attachment of the pressure plate 18 to a coil spring to be tensioned, and it likewise extends over a circumferential angle a of about 90°, as can be recognized from FIGS. 3 and 4. Furthermore, the tensioning surface 24 also has a slope, by which reliable mounting of a spring turn is guaranteed. To make it possible to bring the pressure plate 18 replaceably into engagement with the seat 17 of the tensioning device 9, this pressure plate 18 likewise has an opening 26, which is provided with three radial extension openings 27. This design is essentially also known from the state of the art cited.

To detachably mount the pressure plate 18 on the seat 17, the opening 26 has, as is indicated in FIG. 3, a conical contact surface 28 provided with a bicurve section in the area of its lower edge, especially in the area between the extension openings 27. This type of fastening or connection between the second pressure plate 18 and the seat 17 of the tensioning device 9 is also known already from the state of the art, so that more detailed explanations are unnecessary.

FIGS. 3 and 4 also show that the opening 26 with its extension openings 27 is arranged in the second pressure plate 18 offset by an eccentricity E2 relative to the center 29 of the second pressure plate 18. The direction of the offset E2 in the second pressure plate 18 is directed toward the recess 25, i.e., the eccentric offsets E1 and E2 are provided in opposite directions in case of a congruent arrangement of the two pressure plates 1 and 18 with their respective recesses 3 and 25.

Due to these eccentric offsets E1 and E2 of the two openings 10 and 26 in the respective pressure plates 1 and 18, the position of the tensioning device 9 relative to a coil spring to be tensioned can be adjusted at the spring 5 to be tensioned with the pressure plates 1 and 18 attached correctly, as is apparent from FIG. 6.

FIG. 6 shows the coil spring 5 in the state in which it is installed in a motor vehicle. A body part 30 of this motor vehicle, on which a spring plate 32 is arranged in a firmly seated manner for receiving the upper end 31 of the spring, is shown in FIG. 6. A second spring plate 34, which is used to receive the lower spring end 35, is provided below the said spring plate 32 with a lateral offset in the direction of arrow 33. This lower spring plate 34 is stationarily attached to an axle body 36 of a motor vehicle axle.

FIG. 6 also shows that the lower spring plate 34 has a central passage opening 37, which opens into a cavity 38 of the axle body 36. This cavity 38 is open to the outside or to the bottom, and it likewise has another passage opening 39. This passage opening 39 has a somewhat larger diameter than the lower end 40 of the tensioning device, which said end is designed as a radially expanded head part. The tensioning device 9 can be passed through the passage opening 39 with its head part 40 and can be brought into the position shown in FIG. 6 within the coil spring 5. Provisions are made in this connection for the passage opening 37 of the lower spring plate 34 to be dimensioned such that the tensioning device 9 can be passed through the said passage opening 37 especially with its lower, radially expanded head part 40 with an at least slight clearance.

To attach the spring vice 41 comprising the tensioning device 9 and the two pressure plates 1 and 18 to the coil spring 5 in the correct position shown in FIG. 6, the upper, first pressure plate 1 is first brought into engagement, e.g., in a middle position, with the coil spring 5 with one of the middle spring turns 42. As a next step, the second, lower pressure plate 18 is likewise brought into engagement with one of the middle spring turns 43, which are located below the spring turns 42. The two pressure plates 1 and 18 can be brought from these positions into the position shown in FIG. 6 by being rotated upward or downward along the spring turns of the coil spring 5. The coil spring 5 has a slightly bent shape in this exemplary embodiment, as can be recognized especially from the center line 44 of the coil spring 5, which is shown as an arc-shaped line.

Before the first, upper pressure plate 1 is rotated into its end position, the tensioning device 9 with its upper positive-locking elements 8 can be preferably hung into the mounting depressions 14 of the pressure plate 1, so that when the pressure plate 1 is turned up, this pressure plate 1 is moved toward the upper spring plate 32 together with the tensioning device 9. While the pressure plates 1 and 18 are being rotated along from the middle positions into their end positions, the tensioning device 9 performs a kind of wobbling movement in the hung state, and the end positions of the tensioning device 9, which are shown in FIG. 6, are reached in the two desired positions of the pressure plates 1 and 18 shown. Because of the eccentric arrangement of the opening 26 in the lower pressure plate 18, adjustment of the position of the drive of the tensioning device 9, which said drive is designed as a drive hexagon 21, can be achieved in this end position such that this drive hexagon 21 can be reached with a wrench tool through the passage opening 39 of the axle body 36 in a simple manner.

The tensioning device 9 is thus displaced with its drive hexagon 21 from a middle position 45 indicated by phantom lines in FIG. 6 in the direction of the arrow 46, so that the drive hexagon 21 is aligned with the passage opening 39 of the axle body 36. In addition to this adjustment of the radial position of the drive hexagon 21 to the coil spring 5, the angular adjustment of the tensioning device 9 with its longitudinal central axis 47 is changed by an adjustment in the upper end area in the opposite direction relative to the arrow 46, and the drive hexagon 21 is aligned with the passage opening 39 of the axle body. The eccentric arrangement of the opening 10 in the upper pressure plate 1 in the opposite direction relative to the arrow 46 is provided for this. A radial displacement of the drive 21 in the direction of arrow 46, albeit a slight one, is also brought about additionally by the eccentric displacement of the opening 10 in the first, upper pressure plate 1, because the drive 21 has a rather substantial axial distance in the downward direction from the lower pressure plate 18. Due to this radial and axial alignment, the drive hexagon 21 can be reached and actuated with a corresponding wrench tool in a simple manner.

Since the two pressure plates 1 and 18 should be aligned with their recesses 3 and 25 preferably in the direction of the center of curvature of the coil spring 5, as is indicated in FIG. 6, in the case of a coil spring pretensioned in a bent shape, as is indicated in FIG. 6, it may be necessary, depending on the arrangement of the passage opening 39 on the axle body 36, to adjust the lower pressure plate 18 relative to the coil spring 5 at right angles to the direction of the arrow 46. An offset of the inner limiting edge 48 of the tensioning surface 24 of the lower pressure plate 18, which offset is recognizable in FIG. 4, is provided for this purpose.

Due to this eccentric offset of this limiting edge 48 in at least some areas, a certain clearance is obtained for the arrangement or for the attachment of the lower pressure plate 18 to the corresponding spring turn 49 (FIG. 6). If the lower pressure plate 18 is aligned correctly at the spring turn 49, this clearance makes possible an additional correction or adjustment of the position of the drive hexagon 21 in relation to the passage opening 39 of the axle body 36.

Thus, it can be stated in summary that adjustment of the position of the tensioning device within the coil spring to be tensioned can be achieved in a simple manner due to the design of the spring vice according to the present invention, so that the accessibility of the drive of the tensioning device through the passage opening of the axle body is reliably guaranteed. The amounts of the eccentric offset E1 and E2 of the two openings 10 and 26 may be equal but also different. Provisions are also made for selecting such an eccentric offset only for the lower pressure plate 18, depending on the current position of a passage opening in the axle body, while an angular alignment and displacement of the radial position of the drive 21 are additional, as is shown in FIG. 6, and not necessary, so that the eccentric offset E1 of the upper, first pressure plate 1 equals zero.

Such an eccentric offset of the openings is also not limited to such specific designs as shown in the exemplary embodiment. Thus, pressure plates have also been known whose openings do not have radial extension openings but have essentially a shape similar to the conical contact surface 28 of the lower pressure plate 18. In the case of such openings, provisions are made only to ensure that these openings are, in particular, open toward the two respective recesses 3 and 25, so that the tensioning device can be pushed laterally into these openings with its housing tube 19, on the one hand, and with its threaded tube 15, on the other hand, for hanging the tensioning device. By contrast, the openings themselves may in turn be arranged in the respective pressure plate offset by a certain eccentricity E1 and E2, so that a position of the drive can likewise be adjusted to a passage opening of the axle body in this case. If the first, upper pressure plate 1 also has such an opening provided with a conical contact surface, the three positive-locking elements 8 are also to be replaced with a circular, radially projecting conical surface in order to achieve the most favorable positive locking possible for connecting the tensioning device to the upper pressure plate 1.

Provisions could also be made in the case of such a connection via conical surfaces between the tensioning device 9 and the pressure plates 1 and 18 for these conical surfaces in the pressure plates 1 or 18 to be divided into two areas, so that, e.g., a concentric mounting as well as an eccentrically offset mounting of the tensioning device in the respective pressure plates 1 and 18 can be achieved.

As can be recognized from FIGS. 2 and 4, the direction of the eccentric offset also depends essentially on the desired position of the pressure plates that engage a coil spring during the tensioning of a coil spring. Thus, this offset may, of course, also be selected in the pressure plate at right angles to the directions shown in FIGS. 2 and 4 or also at another desired angle.

As another variant not shown in the drawings, provisions are made for the opening to be part of a separate component, which can be inserted into the pressure plate variably in different positions in relation to the center of the pressure plate. The pressure plate has a kind of elongated hole for this purpose, in which this separate component is inserted in a radially adjustable manner. To fix the desired eccentric or concentric arrangement of the component or of the opening arranged in the component at least during the tensioning operation, the contact surfaces of the components and of the elongated hole of the pressure plate may be provided with a kind of teeth, as a result of which an unintended change in the adjusted position of the component in the pressure plate is reliably prevented from occurring.

While specific embodiments of the invention have been shown and described in detail to illustrate the application of the principles of the invention, it will be understood that the invention may be embodied otherwise without departing from such principles.

What is claimed is:

1. A spring vice, comprising:
   a tensioning device that can be axially introduced into a coil spring to be tensioned;
   a first disk-shaped pressure plate provided with an opening and which can be detachably connected to a first end of said tensioning device via said opening;
   a second pressure plate provided with an opening and which can be detachably connected via said opening to an adjusting member of said tensioning device, said adjusting member being adjustable relative to said first end of said tensioning device;
   a drive associated with said tensioning device, said drive having a wrench profile at said second end of said tensioning device, said wrench profile being accessible from outside of said coil spring for adjusting said adjusting member and each of said pressure plates having a partially circular tensioning surface which is limited toward an inside and an outside of said coil spring and is interrupted by a recess, said tensioning surface for receiving a spring turn of said coil spring to be tensioned, said tensioning surface defining a pressure plate center, said opening of at least one of said pressure plates being arranged in said pressure plate, within a perimeter of said tensioning surface, in an eccentrically offset manner with respect to said center to adjust a position of said drive of said tensioning device of said spring vice attached to said coil spring relative to said coil spring.

2. A spring vice in accordance with claim 1, wherein said opening of said second pressure plate associated with said adjusting member is eccentrically offset from said center toward the recess of the tensioning surface of the said pressure plate.

3. A spring vice in accordance with claim 1, wherein an inner limiting edge of the tensioning surface of said second pressure plate extends eccentrically offset in relation to said pressure plate at least in a circumferential area located opposite said recess.

4. A spring vice in accordance with claim 3, wherein a direction of said offset of said inner limiting edge of said second pressure plate is toward said recess of the tensioning surface of said second pressure plate.

5. A spring vice in accordance with claim 1, wherein said opening of said first pressure plate associated with said first end of said tensioning device is eccentrically offset from said center in a direction opposite a position of said recess of the tensioning surface of said first pressure plate.

6. A spring vice comprising:
   a tensioning device that can be axially introduced into a coil spring to be tensioned;
   a first disk-shaped pressure plate provided with an opening and which can be detachably connected to a first end of said tensioning device via said opening;
   a second pressure plate provided with an opening and which can be detachably connected via said opening to an adjusting member of said tensioning device, said adjusting member being adjustable relative to said first end of said tensioning device;
   a drive associated with said tensioning device, said drive having a wrench profile at said second end of said tensioning device, said wrench profile being accessible from outside of said coil spring for adjusting said adjusting member and each of said pressure plates having a partially circular tensioning surface which is limited toward an inside and an outside of said coil spring and is interrupted by a recess for each receiving a spring turn of said coil spring to be tensioned, said opening of at least one of said pressure plates being arranged in said pressure plate in an eccentrically offset manner to adjust a position of said drive of said tensioning device of said spring vice attached to said coil spring relative to said coil spring wherein amounts of eccentric offsets of said openings in said first and second pressure plates are different or equal.

7. A tensioning device that can be axially introduced into a coil spring to be tensioned;
   a first disk-shaped pressure plate provided with an opening and which can be detachably connected to a first end of said tensioning device via said opening;
   a second pressure plate provided with an opening and which can be detachably connected via said opening to an adjusting member of said tensioning device, said adjusting member being adjustable relative to said first end of said tensioning device;
   a drive associated with said tensioning device, said drive having a wrench profile at said second end of said tensioning device, said wrench profile being accessible from outside of said coil spring for adjusting said adjusting member and each of said pressure plates having a partially circular tensioning surface which is limited toward an inside and an outside of said coil spring and is interrupted by a recess for each receiving a spring turn of said coil spring to be tensioned, said opening of at least one of said pressure plates being arranged in said pressure plate in an eccentrically offset manner to adjust a position of said drive of said tensioning device of said spring vice attached to said coil spring relative to said coil spring wherein said opening in said first and or said second pressure plate is provided in a separate component that can be inserted into said pressure plate in different positions.

8. A spring vice in accordance with claim 7, wherein said component provided with said opening can be fixed in different positions via positive-locking elements arranged differently in said pressure plate.

9. A spring vice in accordance with claim 1, wherein said drive is a spindle drive.

10. A spring vice, comprising:
    a tensioning device;
    a drive associated with said tensioning device, said drive having a wrench profile accessible from outside of said coil spring for adjusting said adjusting member;
    a first pressure plate having tensioning surface interrupted by a recess, said tensioning surface being limited toward an inside and an outside for receiving a spring turn of said coil spring to be tensioned, said tensioning surface having a partially circular extent defining a pressure plate center and having an opening for receiving the tensioning device, said opening being surrounded by said tensioning surface except in the region of said recess to position the tensioning device extending axially in the coil spring to be tensioned;

a second pressure plate having second pressure plate tensioning surface interrupted by a second pressure plate recess, said second pressure plate tensioning surface being limited toward an inside and an outside for receiving a spring turn of said coil spring to be tensioned, said second pressure plate tensioning surface having a partially circular extent defining a second pressure plate center and having a second pressure plate opening for receiving the tensioning device, said second pressure plate opening being surrounded by said second pressure plate tensioning surface except in the region of said second pressure plate recess to position the tensioning device extending axially in the coil spring to be tensioned, one of said opening and said second pressure plate opening being eccentrically offset as to the respective center or the second pressure plate center.

11. A spring vice in accordance with claim 10, wherein said second pressure plate opening associated with said adjusting member is directed eccentrically offset from said second pressure plate center toward the recess of the tensioning surface of the said pressure plate.

12. A spring vice in accordance with claim 10, wherein an inner limiting edge of said second pressure plate tensioning surface extends eccentrically offset in relation to said pressure plate at least in a circumferential area located opposite said recess.

13. A spring vice in accordance with claim 12, wherein a direction of said offset of said inner limiting edge of said second pressure plate is toward said recess of the tensioning surface of said second pressure plate.

14. A spring vice in accordance with claim 10, wherein said opening of said first pressure plate associated with said first end of said tensioning device is eccentrically offset from said center in a direction away from said recess of the tensioning surface of said first pressure plate.

* * * * *